(12) United States Patent
Kamiyama

(10) Patent No.: US 10,941,702 B2
(45) Date of Patent: Mar. 9, 2021

(54) OPPOSED-PISTON INTERNAL COMBUSTION ENGINE

(71) Applicant: TOYOTA JIDOSHA KABUSHIKI KAISHA, Toyota (JP)

(72) Inventor: Eiichi Kamiyama, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/359,239

(22) Filed: Mar. 20, 2019

(65) Prior Publication Data

US 2019/0309680 A1  Oct. 10, 2019

(30) Foreign Application Priority Data

Apr. 9, 2018  (JP) ............................. JP2018-074879

(51) Int. Cl.

| F02B 75/28 | (2006.01) |
|---|---|
| F02B 75/02 | (2006.01) |
| F02B 75/32 | (2006.01) |
| F01L 1/047 | (2006.01) |

(52) U.S. Cl.
CPC ............ *F02B 75/282* (2013.01); *F01L 1/047* (2013.01); *F02B 75/02* (2013.01); *F02B 75/32* (2013.01); *F02B 2075/027* (2013.01)

(58) Field of Classification Search
CPC ........ F02B 75/282; F02B 75/02; F02B 75/32; F02B 1/047
See application file for complete search history.

(56) References Cited

U.S. PATENT DOCUMENTS

| 2,153,899 A | * | 4/1939 | Shover ...................... F01B 7/14 |
|---|---|---|---|
|  |  |  | 123/51 AA |
| 2,334,917 A | * | 11/1943 | Ford .......................... 123/51 AA |
| 4,773,358 A | * | 9/1988 | Heath ...................... F02B 75/26 |
|  |  |  | 123/51 AA |
| 6,039,011 A | * | 3/2000 | Agalarov ................. F02B 25/08 |
|  |  |  | 123/51 A |

(Continued)

FOREIGN PATENT DOCUMENTS

| CN | 1920275 A | 2/2007 |
|---|---|---|
| JP | 2014-206174 A | 10/2014 |

(Continued)

*Primary Examiner* — Kevin A Lathers
(74) *Attorney, Agent, or Firm* — Oliff PLC

(57) ABSTRACT

An opposed-piston internal combustion engine is configured so that one cylinder is provided with two pistons and these pistons reciprocate symmetrically with each other. The engine comprises: an expanded chamber formed at part of a wall of the cylinder positioned between the two pistons when a volume between the two pistons is the minimum and extending in a radial direction of the cylinder; an intake passage communicated with the expanded chamber; an exhaust passage communicated with the expanded chamber; an intake valve opening and closing the intake passage with respect to the expanded chamber; an exhaust valve opening and closing the exhaust passage with respect to the expanded chamber, and crankshafts respectively connected to the pistons. The expanded chamber formed so as to stick out from a wall surface of the cylinder in the same direction as axes of rotation of the crankshafts.

8 Claims, 9 Drawing Sheets

(56) References Cited

U.S. PATENT DOCUMENTS 8,413,619 B2 * 4/2013 Cleeves .................... F01B 7/02
123/78 F
2008/0047530 A1 2/2008 Cleeves

FOREIGN PATENT DOCUMENTS

| JP | 2016-109111 A | 6/2016 |
| JP | 2016-217202 A | 12/2016 |
| JP | 2017-193994 A | 10/2017 |

* cited by examiner

OPPOSED-PISTON INTERNAL COMBUSTION ENGINE

FIELD

The present invention relates to an opposed-piston internal combustion engine.

BACKGROUND

Known in the past has been an opposed-piston internal combustion engine in which two pistons are provided in a single cylinder and in which these pistons reciprocate symmetrically with each other (for example, JP 2017-193994 A, JP 2016-217202 A, JP 2016-109111 A and JP 2014-206174 A).

In such an opposed-piston internal combustion engine, it has been proposed to provide an expanded chamber formed at the part of the wall of the cylinder, which is positioned between the two pistons when the volume between the two pistons is the smallest, and extending in the radial direction of the cylinder (for example, JP 2017-193994 A and JP 2016-217202 A). This expanded chamber is communicated with an intake passage and exhaust passage, and is provided with an intake valve and exhaust valve opening and closing these intake passage and exhaust passage with respect to the expanded chamber. As a result, it is possible to open and close the intake valve and exhaust valve without interference with the pistons.

SUMMARY

Technical Problem

In this regard, if, for example, an opposed-piston internal combustion engine is placed under a floor of a vehicle, an opposed-piston internal combustion engine has to be configured so that its height is lower. In addition, based on design requirement of the vehicle, sometimes it is necessary to make an opposed-piston internal combustion engine as thin as possible even if not arranging it under the floor of the vehicle.

On the other hand, the opposed-piston internal combustion engine described in JP 2017-193994 A and JP 2016-217202 A is configured so that the expanded chamber extends from the wall surface of the cylinder in a direction perpendicular to the axes of rotation of the crankshafts. Therefore, if configuring the opposed-piston internal combustion engine in this way, the length of the opposed-piston internal combustion engine in the direction perpendicular to the axial direction of the axes of rotation of the crankshafts and perpendicular to the axis of the cylinder (below, this length being referred to as the "height" in an opposed-piston internal combustion engine) are longer. As a result, the height of the opposed-piston internal combustion engine is higher and the height of the floor of the vehicle cannot be sufficiently lowered.

The present invention was made in consideration of the above technical problem and has as its object to provide an opposed-piston internal combustion engine able to lower the height in the direction perpendicular to the axial direction of the axes of rotation of the crankshafts and perpendicular to the axis of the cylinder as much as possible.

Solution to Problem

The present invention was made so as to solve the above problem and has as its gist the following.

(1) An opposed-piston internal combustion engine configured so that one cylinder is provided with two pistons and these pistons reciprocate symmetrically with each other, comprising:
an expanded chamber formed at part of a wall of the cylinder positioned between the two pistons when a volume between the two pistons is the minimum and extending in a radial direction of the cylinder; an intake passage communicated with the expanded chamber; an exhaust passage communicated with the expanded chamber; an intake valve opening and closing the intake passage with respect to the expanded chamber; an exhaust valve opening and closing the exhaust passage with respect to the expanded chamber, and crankshafts respectively connected to the pistons,
wherein the expanded chamber formed so as to stick out from a wall surface of the cylinder in the same direction as axes of rotation of the crankshafts.

(2) The opposed-piston internal combustion engine according to above (1), wherein the intake valve opens and closes an intake opening formed at the expanded chamber and communicating with the intake passage, and the intake opening is arranged so as to be positioned asymmetrically with respect to a center line of the expanded chamber running through a center axis of the cylinder and extending in the radial direction of the cylinder.

(3) The opposed-piston internal combustion engine according to above (1) or (2), wherein the expanded chamber is formed so as to be asymmetric with respect to a center line of the expanded chamber running through a center axis of the cylinder and extending in the radial direction of the cylinder.

(4) The opposed-piston internal combustion engine according to any one of above (1) to (3), wherein the intake valve is arranged so that its axis is slanted with respect to the axis of the cylinder when viewed in the direction of the axes of rotation of the crankshafts.

(5) The opposed-piston internal combustion engine according to any one of above (1) to (4), wherein the intake valve is arranged so as to extend from the expanded chamber to one of the crankshafts, and the exhaust valve is arranged so as to extend from the expanded chamber to the other of the crankshafts.

(6) The opposed-piston internal combustion engine according to above (5), further comprising an intake cam configured to rotate once about the one crankshaft while the one crankshaft rotates twice,
wherein the intake valve is configured to be driven by the intake cam.

(7) The opposed-piston internal combustion engine according to above (5) or (6), further comprising an exhaust cam configured to rotate once about the other crankshaft while the other crankshaft rotates twice,
wherein the exhaust valve is configured to be driven by the exhaust cam.

(8) The opposed-piston internal combustion engine according to any one of above (1) to (7), further comprising a spark plug for igniting an air-fuel mixture in the expanded chamber,
wherein the spark plug is arranged so as to extend within ranges of diameters of the pistons when viewed in the direction of the axes of rotation of the crankshafts.

Advantageous Effects of Invention

According to the present invention, there is provided an opposed-piston internal combustion engine able to lower the height in the direction perpendicular to the axial direction of the axes of rotation of the crankshafts and perpendicular to the axis of the cylinder as much as possible.

DESCRIPTION OF EMBODIMENTS

Below, embodiments of the present invention will be explained in detail with reference to the drawings. Note that, in the following explanation, similar components are assigned the same reference signs.

Configuration of Opposed-Piston Internal Combustion Engine

Figure 1:
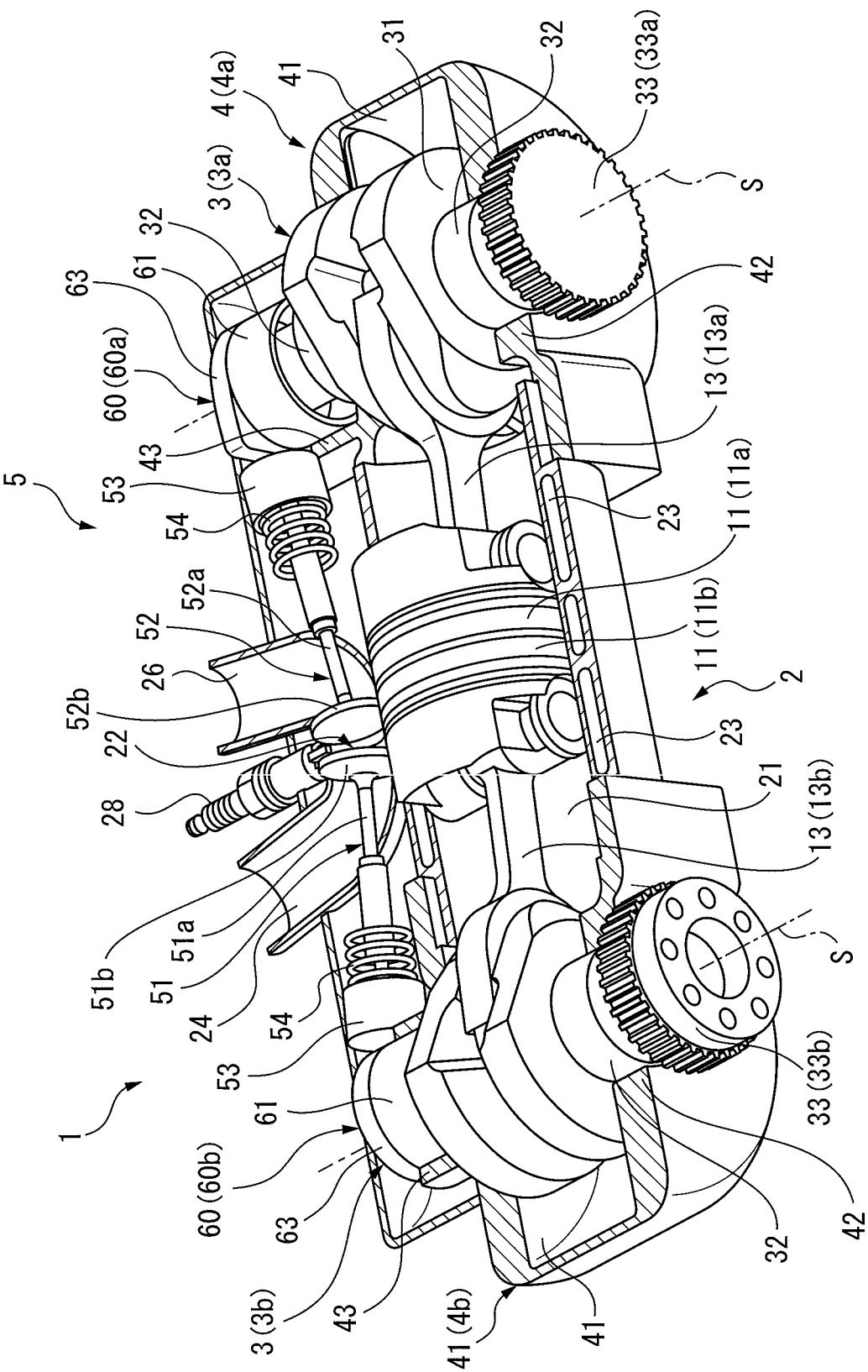
FIG. 1 is a partial cross-sectional perspective view of an opposed-piston internal combustion engine according to one embodiment seen from the front.
Figure 2:
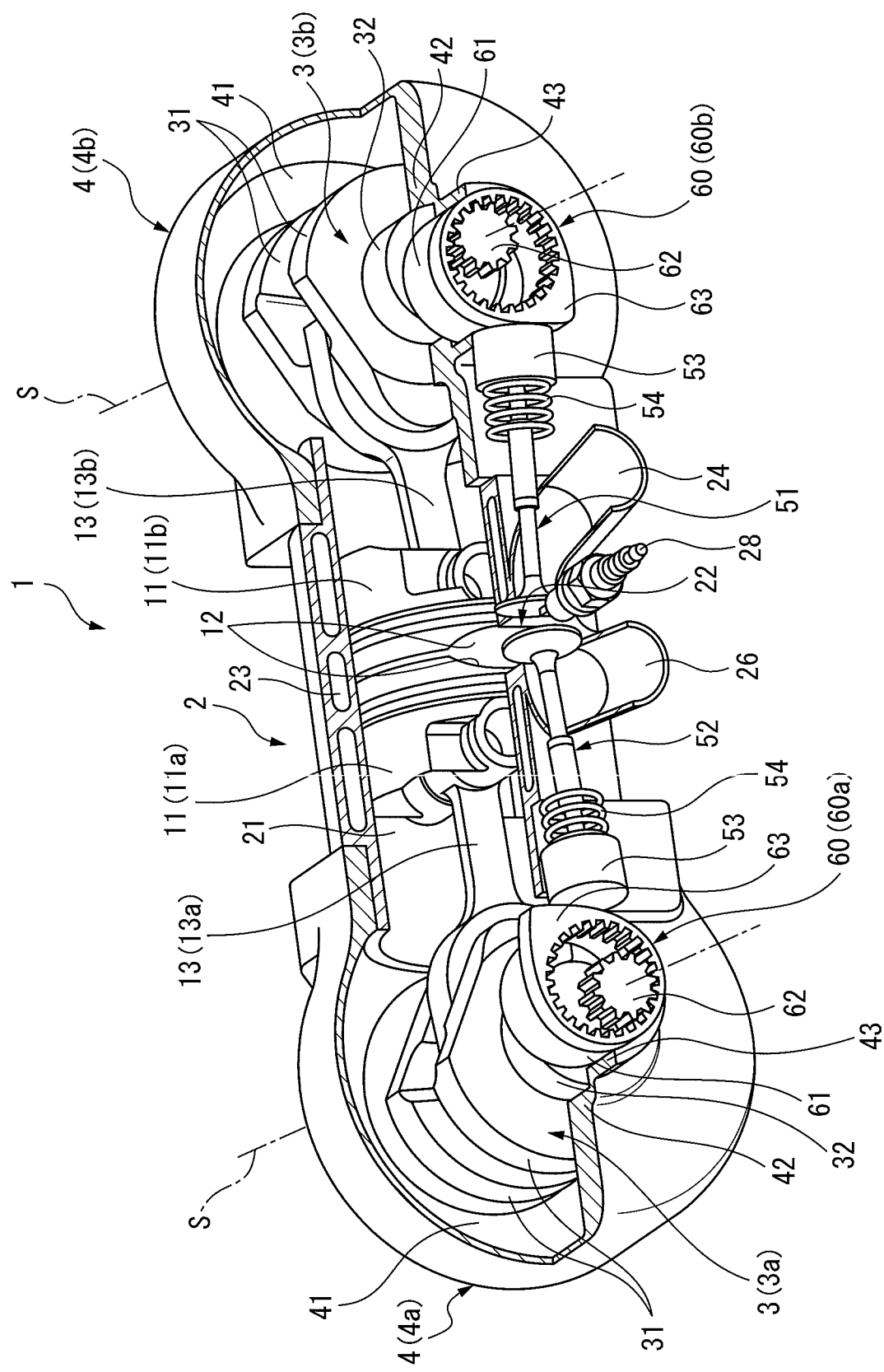
FIG. 2 is a partial cross-sectional perspective view of the opposed-piston internal combustion engine according to one embodiment seen from the back.

Below, referring to FIGS. 1 to 6, the configuration of an opposed-piston internal combustion engine (below, also simply referred to as an "internal combustion engine") 1 according to the present embodiment will be explained. FIG. 1 is a partial cross-sectional perspective view of the internal combustion engine 1 according to the present embodiment seen from the front. FIG. 2 is a partial cross-sectional perspective view of the internal combustion engine 1 according to the present embodiment seen from the back. FIG. 1 is a cross-sectional view in the state where the top halves of the cylinder block and crankcases are cut away, while FIG. 2 is a cross-sectional view in the state where ¼ of the cylinder block and crankcases are cut away.

Figure 3:
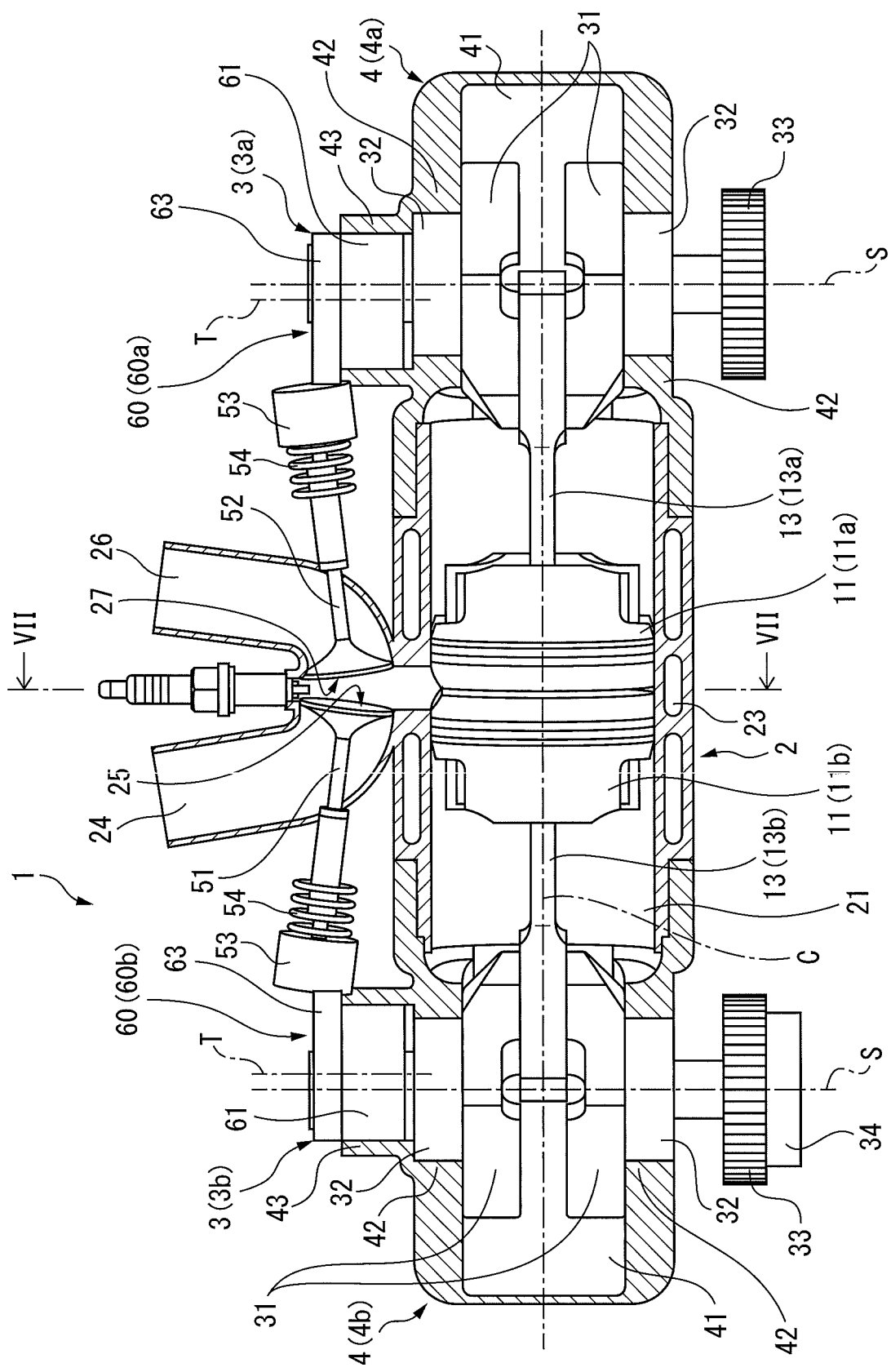
FIG. 3 is a partial cross-sectional plan view of the opposed-piston internal combustion engine according to one embodiment.
Figure 4:
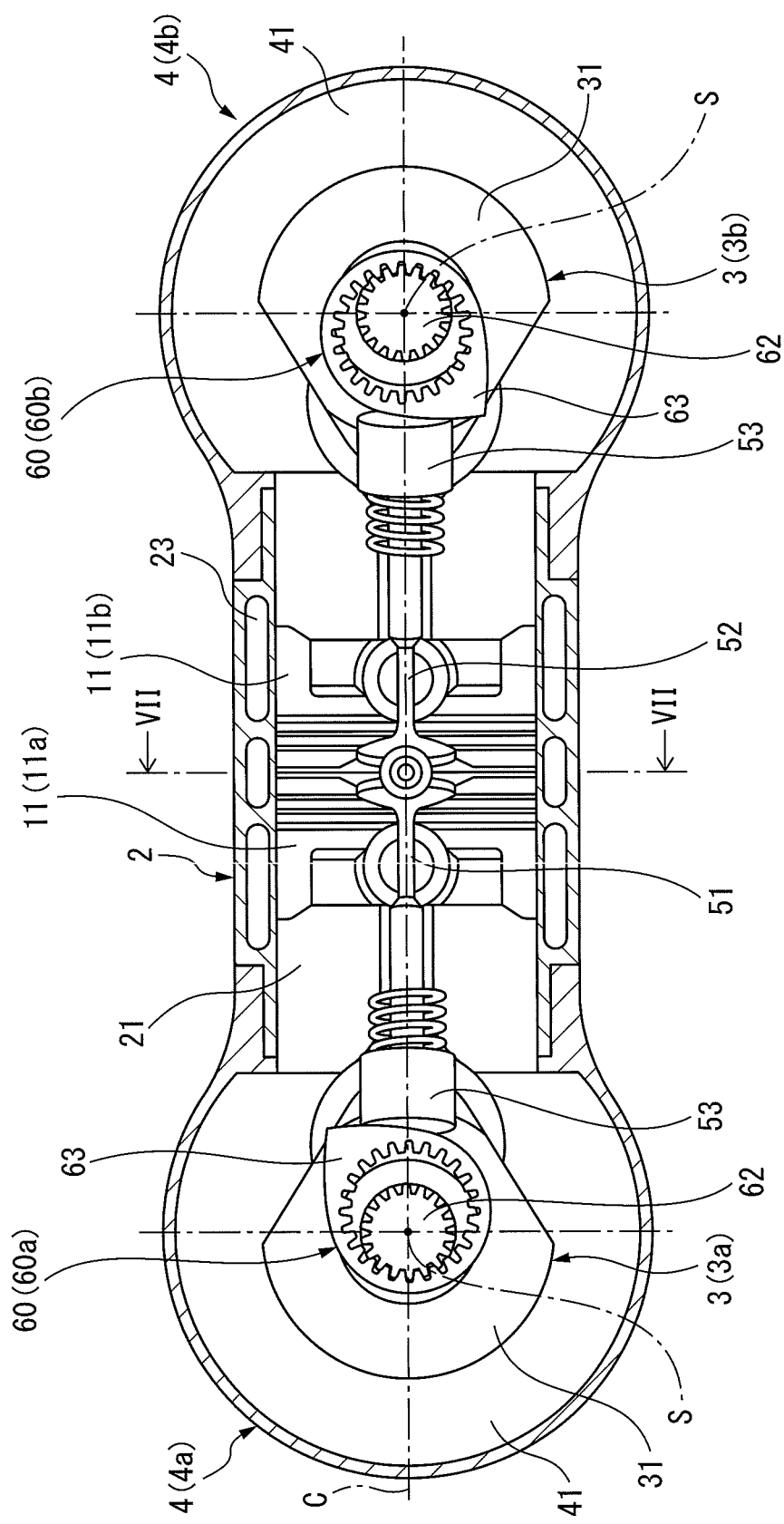
FIG. 4 is a partial cross-sectional side view of the opposed-piston internal combustion engine according to one embodiment seen from the back.
Figure 5:
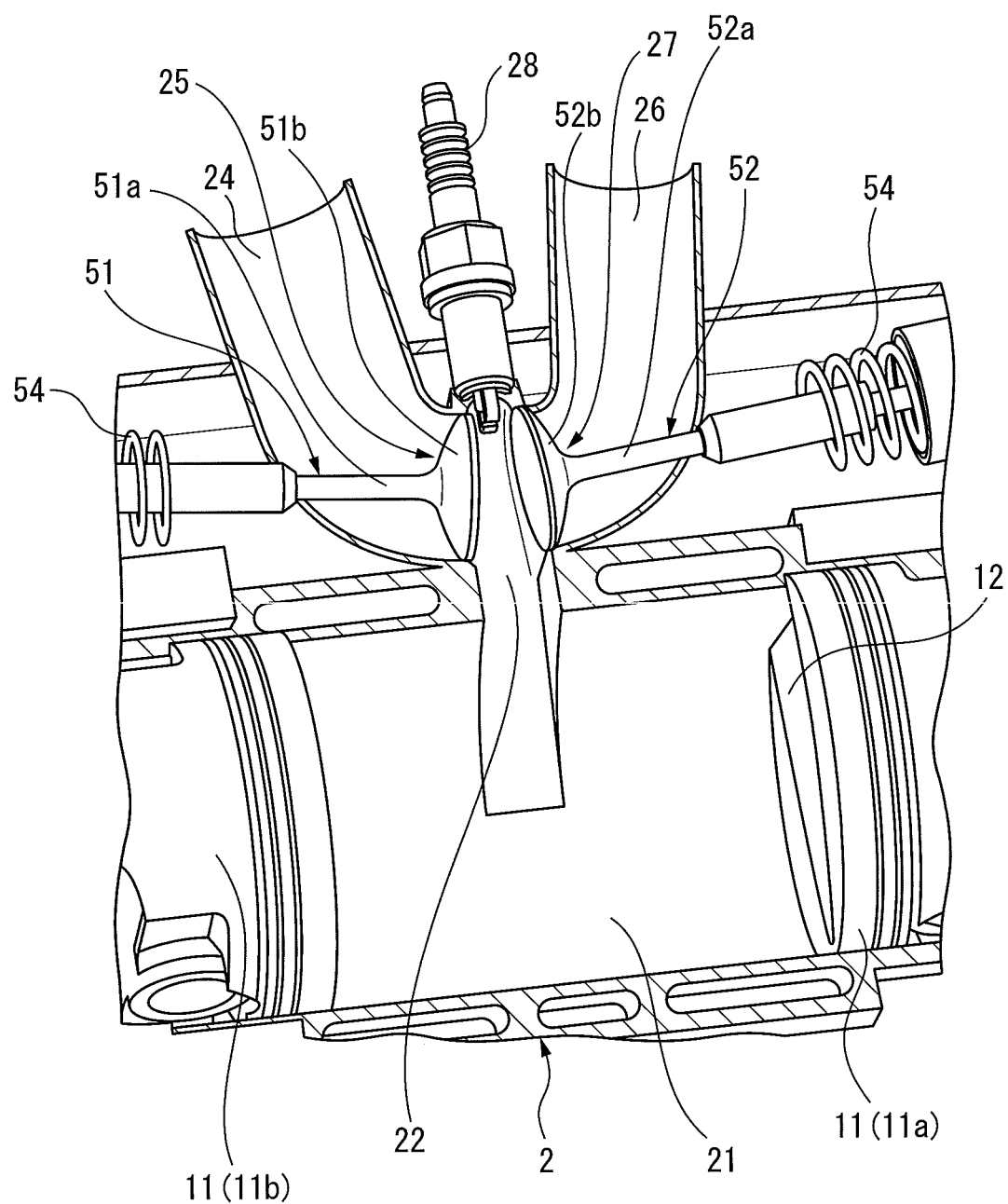
FIG. 5 is a partial cross-sectional perspective view of the opposed-piston internal combustion engine shown with the vicinity of the center of the cylinder enlarged, which is seen from the front.
Figure 6:
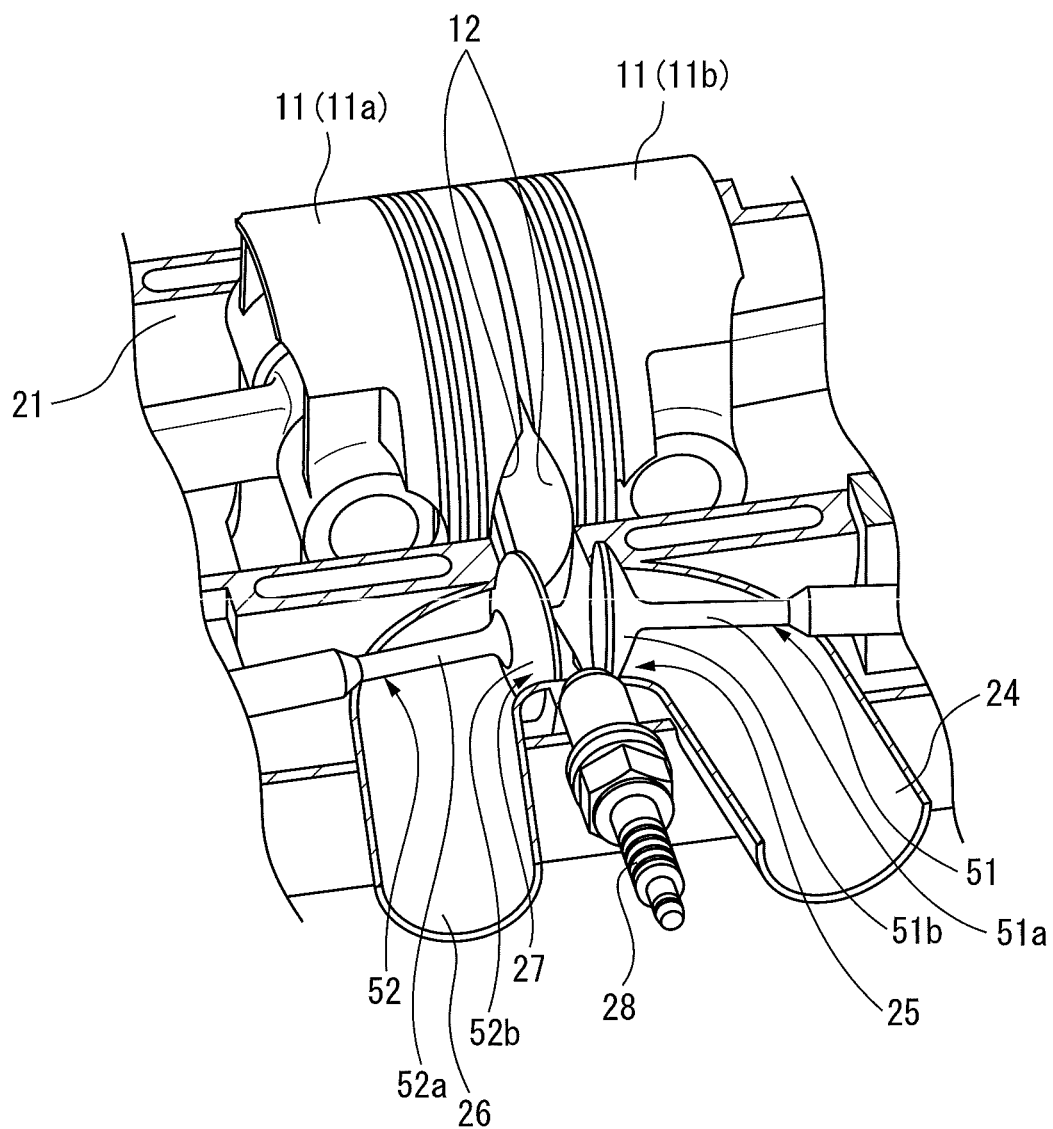
FIG. 6 is a partial cross-sectional perspective view of the opposed-piston internal combustion engine shown with the vicinity of the center of the cylinder enlarged, which is seen from the back.

Further, FIG. 3 is a partial cross-sectional plan view of the internal combustion engine 1 according to the present embodiment, while FIG. 4 is a partial cross-sectional side view of the internal combustion engine 1 according to the present embodiment seen from the back. In addition, FIG. 5 is a partial cross-sectional perspective view of the internal combustion engine 1 seen from the front and a view showing the vicinity of the center of the cylinder enlarged. FIG. 6 is a partial cross-sectional perspective view of the internal combustion engine 1 seen from the back and a view showing the vicinity of the center of the cylinder enlarged. FIGS. 1 to 4 and 6 show a state at the time when the two pistons are both near top dead center, while FIG. 5 shows a state at the time when the two pistons are both near bottom dead center.

Note that, in this Description, the direction perpendicular to the direction of the axes of rotation of the crankshafts (below, referred to as the "crank axes") and perpendicular to the direction of the axis of the cylinder (below, referred to as the "cylinder axis") will be referred to as the "up-down direction" or "height direction" of the opposed-piston internal combustion engine. Further, the length in the up-down direction will be referred to as the "height". However, an opposed-piston internal combustion engine does not necessarily have to be arranged so that the crank axes S and the cylinder axis C extend horizontally. Therefore, an opposed-piston internal combustion engine may be arranged, for example, so that the crank axes S extend in the vertical direction or the cylinder axis C extends in the vertical direction.

As shown in FIGS. 1 to 6, the internal combustion engine 1 is comprised of a single cylinder block 2, two pistons 11, two connecting rods 13, two crankshafts 3, and two crankcases 4.

Cylinder Block

The cylinder block 2 is faulted by metal, such as cast iron or an aluminum alloy. The cylinder block 2 is formed so as to include, inside it, a cylinder 21 housing two pistons 11 and an expanded chamber 22 formed at part of the wall of the cylinder 21.

The cylinder 21 is fainted so that the two pistons 11 reciprocate in the cylinder 21. Further, the cylinder 21 is formed so that the length thereof in the axial direction is longer than two times the stroke lengths of the pistons. Further, around the cylinder 21, a plurality of cooling water paths 23 are formed so as to extend in the circumferential direction of the cylinder 21. In the cooling water paths 23, cooling water flows for cooling the internal combustion engine 1.

The expanded chamber 22 is a space extending from the inner wall of the cylinder 21 in the radial direction of the cylinder 21 (that is, the direction perpendicular to the cylinder axis C). The expanded chamber 22 is formed near the center of the cylinder 21 in the cylinder axis C direction. Therefore, at least part of the expanded chamber 22 is formed at part of the wall of the cylinder 21 positioned between the two pistons 11 when the pistons 11 reciprocating in the cylinder 21 are both positioned near top dead center and the volume between the two pistons 11 is the smallest. Preferably, the expanded chamber 22 is formed at part of the wall of the cylinder 21 positioned between the two pistons 11 when the volume between the two pistons 11 is the smallest or when at least one of the pistons 11 is positioned at top dead center. The wall surface of the expanded chamber 22, the facing surfaces of the two pistons 11 (surfaces facing other pistons), and the inner wall surface of the cylinder 21 define a combustion chamber in which an air-fuel mixture is burned.

Further, in the cylinder block 2, an intake port 24 through which intake gas flowing into the combustion chamber flows, is formed. The intake port 24 is communicated with the expanded chamber 22 through an intake opening 25 formed at the part of the cylinder block 2 defining the expanded chamber 22 (part of the wall surface of the expanded chamber 22).

The intake port 24 is communicated with an intake pipe, while the intake pipe is provided with a throttle valve for controlling the flow of intake gas flowing into the combustion chamber, a fuel injector for injecting fuel into the intake gas, etc. (all not shown). The intake port 24 and intake pipe form an intake passage through which the intake gas flows. Therefore, the expanded chamber 22 is communicated with the intake passage through the intake opening 25. Further, the fuel injector may also be provided at the intake port 24 instead of the intake pipe. Whatever the case, in the present embodiment, the air-fuel mixture containing air and fuel flows from the intake port 24 to the combustion chamber.

In addition, in the cylinder block 2, an exhaust port 26 through which exhaust gas flowing out from the combustion chamber flows, is formed. The exhaust port 26 is communicated with the expanded chamber 22 through an exhaust opening 27 formed at the part of the cylinder block 2 defining the expanded chamber 22 (part of wall surface of the expanded chamber 22).

The exhaust port 26 is communicated with an exhaust pipe, while the exhaust pipe is provided with an exhaust purification system for purifying the exhaust gas, a muffler reducing the noise generated when exhaust gas is exhausted into the atmosphere, etc. (all also not shown). The exhaust port 26 and exhaust pipe form an exhaust passage through which exhaust gas flows. Therefore, the expanded chamber 22 communicates with the exhaust passage through the exhaust opening 27.

Further, in the present embodiment, the intake port 24 and exhaust port 26 are formed so as to extend in a plane parallel to the cylinder axis C and the axes of the later explained crankshafts 3 (below, referred to as "cylinder/crank plane"). Note that, the intake port 24 and exhaust port 26 may also be formed so as to be slanted with respect to the cylinder/crank plane. However, even in this case, the intake port 24 and exhaust port 26 preferably extend between the cylinder/crank plane contiguous with the top part of the cylinder 21 and the cylinder/crank plane contiguous with the bottom part of the cylinder 21. Therefore, the intake port 24 and exhaust port 26 are preferably arranged so as to extend in the ranges of the diameters of the pistons 11 when viewed in the crank axis S direction. In this case, the intake port 24 and exhaust port 26 do not extend above or below the internal combustion engine 1, and therefore the height of the internal combustion engine 1 can be kept low.

Further, at the wall surface of the expanded chamber 22 the most separated from the inner surface of the cylinder 21 in the radial direction, a spark plug 28 for igniting the air-fuel mixture in the combustion chamber is provided. In the present embodiment, the spark plug 28 is arranged so as to extend on a cylinder/crank plane. Note that, the spark plug 28 may also be formed so as to be slanted with respect to a cylinder/crank plane. However, even in this case, the spark plug 28 preferably extends between the cylinder/crank plane contiguous with the top part of the cylinder 21 and the cylinder/crank plane contiguous with the bottom part of the cylinder 21. Therefore, the spark plug 28 is preferably arranged so as to extend in the ranges of the diameters of the pistons 11 when viewed in the crank axis S direction. In this case, the spark plug 28 does not extend above or below the internal combustion engine 1, and therefore it is possible to keep the height of the internal combustion engine 1 low.

Note that, the cylinder block 2 may also be provided with a fuel injector so as to directly inject fuel into the combustion chamber. Further, the illustrated cylinder block 2 is integrally formed, but may also be configured by a plurality of separately formed parts which are joined, for example, by bolts. For example, the cylinder block 2 is cast in a state split into two parts at the center, is machined as necessary so as to provide such as the valve seat, then is joined, for example, by bolting.

Two pistons 11 are provided in a single cylinder 21. These two pistons 11 are configured so as to reciprocate along the cylinder axis C symmetrical with each other. The facing surfaces of the pistons 11, as will be understood from FIGS. 2 and 6, are formed with grooves 12 extending in the crank axis S direction. In particular, in the present embodiment, the grooves 12 are formed so as to gradually become deeper toward the side of the cylinder where the expanded chamber 22 is provided. In addition, in the present embodiment, the grooves 12 are formed so as to become arc-shaped at the cross-sections perpendicular to the crank axis S direction. The grooves 12 formed in this way are formed so that when the pistons 11 are at top dead center, the space formed by the grooves 12 of the two pistons 11 faces and is communicated with the expanded chamber 22 (see FIGS. 2 and 6).

Each connecting rod 13 is connected to one piston 11 through a piston pin at one end part to be able to swing with respect to the piston 11. Further, each connecting rod 13 is connected to a crank pin of a crankshaft 3 at the other end part to be able to swing with respect to the crank pin. The connecting rod 13 converts the reciprocating linear motion of the piston 11 to rotary motion of the crankshaft 3.

Crankshafts and Crankcases

Two crankshafts 3 are provided at the crankcases 4 and are arranged so as to be able to rotate about the crank axes S. In particular, in the present embodiment, the crankshafts 3 are arranged so that the crank axes S perpendicularly intersect the cylinder axis C. However, the crankshafts 3 may be arranged so that the crank axes S do not cross the cylinder axis C, that is, so that they are offset from the cylinder axis C.

Each crankshaft 3 is provided with crank pins to which a connecting rod 13 is connected, crank arms 31 arranged at the two sides of the crank pins, crank journals 32 arranged at the two sides of the crank pins through the crank arms 31, and an interlocking gear 33 provided at one end part of the crankshaft 3.

The crank pins are arranged to have axes extending in parallel to the crank axes S offset from the crank axes S. The crank journals 32 are supported at crank bearings 42 provided at the crankcases 4 rotatably about the crank axes S in the crank bearings 42.

A first crankshaft 3a among the two crankshafts 3 is connected to a first piston 11a through a first connecting rod 13a. Therefore, the first crankshaft 3a is operated to rotate along with the reciprocating motion of the first piston 11a. A second crankshaft 3b among the two crankshafts 3 is connected to a second piston 11b through a second connecting rod 13b. Therefore, the second crankshaft 3b is operated to rotate along with the reciprocating motion of the second piston 11b.

The first crankshaft 3a is provided with a first interlocking gear 33a, while the second crankshaft 3b is provided with a second interlocking gear 33b. These first interlocking gear 33a and second interlocking gear 33b are connected with each other by gears or a chain placed between them (not shown). As a result, the first interlocking gear 33a and the second interlocking gear 33b rotate synchronously and thereby the first crankshaft 3a and the second crankshaft 3b rotate synchronously. In particular, in the present embodiment, the two crankshafts 3 rotate synchronously so that when the first piston 11a is at top dead center, the second piston 11b is also positioned at top dead center, while when the first piston 11a is at bottom dead center, the second piston 11b is also positioned at bottom dead center.

Note that, if possible to make the first crankshaft 3*a* and the second crankshaft 3*b* rotate synchronously, the components other than the interlocking gears may be provided at the crankshafts 3.

Further, at the end part of one of the two crankshafts 3 (in the illustrated example, the second crankshaft 3*b*), an output shaft mounting part 34 is provided. In particular, in the present embodiment, the output shaft mounting part 34 is joined to the outside of the interlocking gear 33. The output shaft mounting part 34 rotates about the crank axis S and is connected to an output shaft of an outside part of the internal combustion engine 1.

A first crankcase 4*a* among the two crankcases 4 is joined to one end part of the cylinder block 2 and houses the first crankshaft 3*a*. On the other hand, a second crankcase 4*b* is joined to the other end part of the cylinder block 2 and houses the second crankshaft 3*b*.

Each crankcase 4 is respectively provided with a crank chamber 41, two crank bearings 42, and a timing gear bearing 43. Each crank chamber 41 houses a crank pin of the crankshaft 3 and crank arms 31. Two crank bearings 42 are provided at each crankcase 4 and are configured so that their axes match the crank axis S. The crank bearings 42 rotatably support the crank journals 32 of the crankshafts 3.

One timing gear bearing 43 is provided at each crankcase 4 and is configured so that its axis extends in parallel to the crank axis S while offset from the crank axis. The timing gear bearing 43 supports an internal timing gear 61 of the later explained cam mechanism 60 rotatably about an axis offset from the crank axis S.

Valve Operating System

As shown in FIGS. 1 to 4, the internal combustion engine 1 is further provided with a valve operating system 5. The valve operating system 5 is provided with an intake valve 51, exhaust valve 52, valve lifters 53, valve springs 54, and cam mechanisms 60.

The intake valve 51 is provided with a valve stem 51*a* and a valve body 51*b* extending perpendicularly to the valve stem 51*a*. The intake valve 51 is arranged at the cylinder block 2 so that it slides along its axis (axis of valve stem 51*a*).

Further, the intake valve 51 is arranged so that the valve body 51*b* closes the intake opening 25 when the intake valve 51 is at the closed position (not lifted position). In particular, in the present embodiment, the intake opening 25 is configured so as to be positioned on a plane substantially parallel (specifically, with a relative angle of within 15°, preferably within 10° or so) to the facing surfaces of the pistons 11 (that is, a plane perpendicular to the cylinder axis C). Therefore, the valve body 51*b* of the intake valve 51 is also arranged so as to be positioned on a plane substantially parallel (specifically, with a relative angle of within 15°, preferably within 10° or so) to the facing surfaces of the pistons 11.

Therefore, the intake valve 51 is arranged so that its axis extends substantially parallel (specifically, with a relative angle of within 15°, preferably within 10° or so) to the cylinder axis C. In particular, in the present embodiment, the intake valve 51, as shown in FIGS. 1 to 6, is arranged so as to extend from the expanded chamber 22 toward the second crankshaft 3*b*. Therefore, since the intake valve 51 does not extend above or below the internal combustion engine 1, the height of the internal combustion engine 1 can be kept low.

In addition, the intake valve 51 is arranged so that the valve body 51*b* does not close the intake opening 25 when the intake valve 51 is at the open position (lifted position). Therefore, the intake valve 51 opens and closes the intake opening 25 and thereby opens and closes the intake passage with respect to the expanded chamber 22.

The exhaust valve 52 is provided with a valve stem 52*a* and a valve body 52*b* extending perpendicularly with respect to the valve stem 52*a*. The exhaust valve 52 is arranged at the cylinder block 2 so as to slide along its axis (axis of valve stem 52*a*).

Further, the exhaust valve 57 is arranged so that the valve body 52*b* closes the exhaust opening 27 when the exhaust valve 52 is at the closed position (not lifted position). In particular, in the present embodiment, the exhaust opening 27 is configured so as to be positioned on a plane substantially parallel (specifically, with a relative angle of within 15°, preferably within 10° or so) to the facing surfaces of the pistons 11 (that is, a plane perpendicular to the cylinder axis C). Therefore, the valve body 52*b* of the exhaust valve 52 is also arranged so as to be positioned on a plane substantially parallel (specifically, with a relative angle of within 15°, preferably within 10° or so) to the facing surfaces of the pistons 11.

Therefore, the exhaust valve 52 is arranged so that its axis extends substantially in parallel (specifically, with a relative angle of within 15°, preferably within 10° or so) to the cylinder axis C. In particular, in the present embodiment, the exhaust valve 52, as shown in FIGS. 1 to 6, is arranged so as to extend from the expanded chamber 22 toward the first crankshaft 3*a*. Therefore, since the exhaust valve 52 does not extend above or below the internal combustion engine 1, it is possible to keep the height of the internal combustion engine 1 low.

In addition, the exhaust valve 52 is arranged so that the valve body 52*b* does not close the exhaust opening 27 when the exhaust valve 52 is at the open position (lifted position). Therefore, the exhaust valve 52 opens and closes the exhaust opening 27 and thereby opens and closes the exhaust passage with respect to the expanded chamber 22.

The valve lifters 53 are arranged at the end part of the intake valve 51 at the opposite side from the valve body 51*b* and the end part of the exhaust valve 52 at the opposite side from the valve body 52*b*. The valve lifters 53 abut against the cams 63 of the later explained cam mechanisms 60 and lift the intake valve 51 and exhaust valve 52 depending on the profile of the cams 63. Therefore, the intake valve 51 is driven to open and close by an intake cam 63*b* through a valve lifter 53, while the exhaust valve 52 is driven to open and close by an exhaust cam 63*a* through a valve lifter 53.

Note that, in the present embodiment, the valve lifters 53 are provided between the intake valve 51 and a cam 63 and between the exhaust valve 52 and a cam 63. However, instead of valve lifters 53, rocker arms and lash adjusters, etc., may also be provided.

The valve springs 54 bias the intake valve 51 and exhaust valve 52 in the closing directions. Therefore, the intake valve 51 and exhaust valve 52 close the intake opening 25 and exhaust opening 27 by the valve springs 54 unless they are biased by the cams 63 in the lift directions.

The two cam mechanisms 60 are provided with internal timing gears 61, external timing gears 62, and cams 63 joined to the internal timing gears 61. A first cam mechanism 60*a* is positioned adjoining the exhaust valve 52 and is connected to the first crankshaft 3*a*. On the other hand, a second cam mechanism 60*b* is positioned adjoining the intake valve 51 and is connected to the second crankshaft 3*b*.

The internal timing gears 61 are formed into cylindrical shapes and are formed with gears at their inner surfaces. They are received in the timing gear bearings 43 of the crankcases 4 and are made to rotate in the timing gear bearings 43. As explained above, the timing gear bearings 43 are offset in their axes from the crank axes S, and therefore the internal timing gears 61 supported by the timing gear bearings 43 rotate about gear axes T offset from the crank axes S. The internal timing gears 61 are not connected to the crankshafts 3.

The external timing gears 62 are arranged inside of the internal timing gears 61 and are joined to the crankshafts 3. Therefore, the external timing gears 62 rotate about the crank axes S together with the crankshafts 3. In particular, in the present embodiment, the external timing gears 62 are provided at the end parts of the crankshafts 3 at the opposite sides to the end parts of the interlocking gear 33. The external timing gear 62 of the first cam mechanism 60a is connected to the first crankshaft 3a, while the external timing gear 62 of the second cam mechanism 60b is connected to the second crankshaft 3b.

At the outer circumferential surfaces of the external timing gears 62, gears are formed. The gears mesh with the gears formed at the inner surfaces of the internal timing gears 61. In particular, the numbers of teeth of the external timing gears 62 are half of the numbers of teeth of the internal timing gears 61. Therefore, when the external timing gears 62 rotate twice, the internal timing gears 61 rotate once.

The cams 63 are joined to the internal timing gears 61 and rotate together with the internal timing gears 61. The cams 63 are formed so that their outer circumferential surfaces at least partially stick out to the outsides from the outer circumferential surfaces of the internal timing gears 61. The outer circumferential surfaces of the cams 63 abut against the back surfaces of the valve lifters 53, and when the cam lobes of the cams 63 abut against the valve lifters 53 along with rotation of the cams 63, the intake valve 51 or exhaust valve 52 is lifted.

In particular, in the present embodiment, the exhaust cam 63a of the first cam mechanism 60a is driven by the first crankshaft 3a through an internal timing gear 61 and external timing gear 62. Therefore, the first cam mechanism 60a is configured so that while the first crankshaft 3a rotates two times, the exhaust cam 63a rotates once about the first crankshaft 3a. The exhaust cam 63a abuts against the valve lifter 53 of the exhaust valve 52, and therefore the exhaust valve 52 is lifted by the rotation of the exhaust cam 63a.

On the other hand, the intake cam 63b of the second cam mechanism 60b is driven by the second crankshaft 3b through an internal timing gear 61 and external timing gear 62. Therefore, the second cam mechanism 60b is configured so that while the second crankshaft 3b rotates two times, the intake cam 63b rotates once about the second crankshaft 3b. The intake cam 63b abuts against the valve lifter 53 of the intake valve 51, and therefore the intake valve 51 is lifted by the rotation of the intake cam 63b.

In the cam mechanism 60 in the present embodiment, no camshafts are provided for the intake cam and exhaust cam separate from the crankshafts 3. Therefore, according to the present embodiment, compared to when separately providing camshafts, it is possible to make the cam mechanisms 60 and in turn the internal combustion engine 1 simpler in structure and possible to reduce their weights.

Configuration of Expanded Chamber

Figure 7:
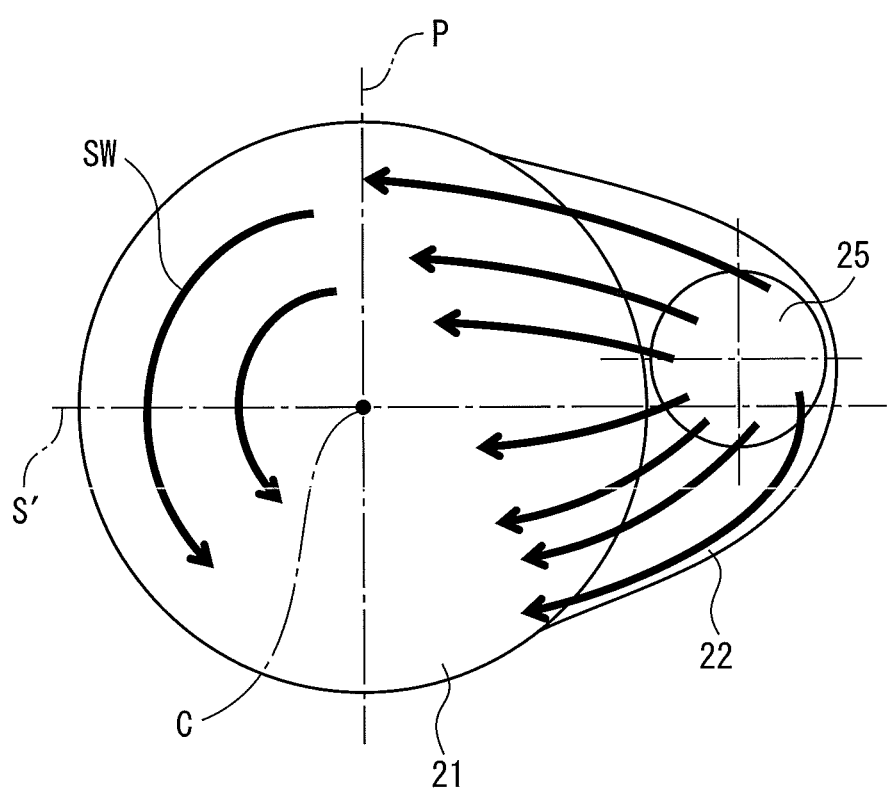
FIG. 7 is a schematic cross-sectional view of a cylinder block seen along the line VII-VII of FIGS. 3 and 4.

Next, referring to FIG. 7 in addition to FIGS. 1 to 6, the configuration of the expanded chamber 22 will be explained. FIG. 7 is a schematic cross-sectional view of the cylinder block 2 seen along the line VII-VII of FIGS. 3 and 4.

As will be understood from FIGS. 1 to 7, the expanded chamber 22 is formed so as to stick out from the inner wall surface of the cylinder 21 in the same direction as the crank axes S. In this regard, "the expanded chamber 22 . . . stick out from the inner wall surface of the cylinder 21 in the same direction as the crank axes S" means the expanded chamber 22 is provided with a part extending from the center of the cylinder 21 in the crank axis S direction. On the other hand, the expanded chamber 22 is not provided with a part extending from the inner wall surface of the cylinder 21 in an axis P (see FIG. 7) direction perpendicular to the crank axes S and the cylinder axis C.

In particular, in the present embodiment, the expanded chamber 22, as will be explained from FIG. 7, is configured so as to have a semielliptical shape or shape similar to the same in the cross-section shown in FIG. 7 (cross-section perpendicular to the cylinder axis C). In the illustrated example, the vertex of the semielliptical shape of the expanded chamber 22 is positioned on the axis S' running through the cylinder axis C and extending in the same direction as the crank axes S. However, the vertex of the elliptical shape does not necessarily have to be positioned on the axis S'. The vertex of the expanded chamber 22 in the cylinder axis C direction may also be positioned above the axis S' or may also be positioned below it.

Note that, the expanded chamber 22 does not necessarily have to be a semielliptical shape in the cross-section shown in FIG. 7. It may be any shape so long as a shape where the height becomes lower as separated further from the center of the cylinder 21 in the radial direction.

In this regard, if, unlike the present embodiment, the expanded chamber 22 sticks out above or below the cylinder 21, the height of the internal combustion engine 1 is higher by this amount of the expanded chamber 22. However, in the present embodiment, the expanded chamber 22 sticks out in the same direction as the crank axes S, and therefore it is possible to keep the height of the internal combustion engine 1 low. That is, according to the internal combustion engine 1 according to the present embodiment, it is possible to lower the height of the internal combustion engine 1 in the direction perpendicular to the crank axes and the cylinder axis as much as possible.

In addition, the expanded chamber 22 is formed so that the width in the cylinder axis C direction is shorter as separated further from the center of the cylinder 21 in the radial direction. Therefore, as shown in FIG. 3, the valve body 51b of the intake valve 51 and the valve body 52b of the exhaust valve 52 is slanted with respect to a plane perpendicular to the cylinder axis C so as to approach each other as separated further from the center of the cylinder 21 in the radial direction.

Further, in the example shown in FIG. 7, the center line of the expanded chamber 22 running through the cylinder axis C and extending in the radial direction of the cylinder 21 matches the axis S'. The center line of the expanded chamber 22 is set so that the volume of the expanded chamber 22 at the upper side from a plane passing through the center line and extending in the cylinder axis C direction and the volume of the expanded chamber 22 at the lower side from this plane are equal to each other. In the example shown in FIG. 7, the shape of the expanded chamber 22 is formed so as to be symmetrical with respect to the center line of the expanded chamber 22 in the cross-section shown in FIG. 7.

On the other hand, the intake opening 25 is arranged so that its center is offset from the center line of the expanded chamber 22 in the cross-section shown in FIG. 7. In other words, the intake opening 25 is arranged so as to be asymmetric with respect to the center line of the expanded chamber 22 in the cross-section shown in FIG. 7. In the example shown in FIG. 7, the intake opening 25 is arranged so that its center is offset above the center line of the expanded chamber 22.

By the intake opening 25 being arranged so as to be asymmetric with respect to the center line of the expanded chamber 22 in this way, as shown in FIG. 7, a bias occurs in the flow of intake air flowing from the intake opening 25 into the combustion chamber. In the example shown in FIG. 7, specifically, the flow of intake gas flowing from the intake opening 25 along the wall surface of the expanded chamber 22 and the cylinder 21 above the center line of the expanded chamber 22 is strong, while the flow of intake gas flowing from the intake opening 25 along the wall surface of the expanded chamber 22 and the cylinder 21 below the center line of the expanded chamber 22 is weak. As a result, in the intake gas in the combustion chamber, the swirl flow shown by the arrow SW in FIG. 7 is formed.

Figure 8:
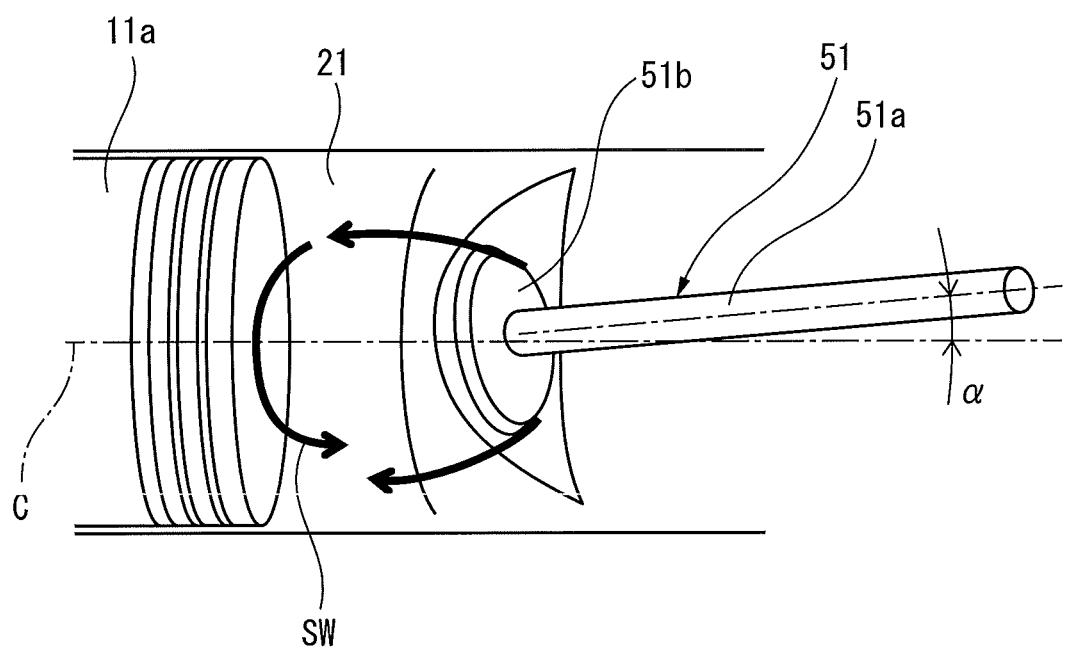
FIG. 8 is a schematic view showing a positional relationship of an intake valve and a cylinder when viewing the cylinder block in a crank axis direction.

FIG. 8 is a schematic view showing a positional relationship of the intake valve 51 and the cylinder 21 when viewing the cylinder block 2 along the crank axis S direction. As will be understood from FIG. 8, in the present embodiment, the intake valve 51 is slanted in its axis by the angle $\alpha$ with respect to the cylinder axis C direction (the angle $\alpha$, as explained above, is within 15°, preferably within 10°). Therefore, the valve body 51b of the intake valve 51 and intake opening 25 are also slanted by the angle $\alpha$ with respect to the cylinder axis C direction when viewed in the crank axis S direction.

If, in this way, the valve body 51b of the intake valve 51 and the intake opening 25 are slanted by the angle $\alpha$ with respect to the cylinder axis C direction, as shown in FIG. 8, when intake gas flows into the combustion chamber, the strength of the flow of intake gas flowing through the side above the valve body 51b of the intake valve 51 to the inside of the combustion chamber and the strength of the flow of intake gas flowing through the side below the valve body 51b of the intake valve 51 to the inside of the combustion chamber will differ from each other. As a result, a swirl flow will be formed in the intake gas in the combustion chamber in the direction shown by the arrow SW in FIG. 8.

In the present embodiment, the expanded chamber 22 and the intake valve 51 are configured so that the swirling direction of the swirl flow formed by arranging the intake opening 25 to be asymmetric with respect to the center line of the expanded chamber 22 and the swirling direction of the swirl flow formed by arranging the intake valve 51 slanting with respect to the cylinder axis C direction match. Therefore, in the present embodiment, a strong swirl flow can be formed in the combustion chamber.

Note that, in the above embodiment, the expanded chamber 22 is formed so as to be symmetric with respect to the center line of the expanded chamber 22 in the cross-section shown in FIG. 7. However, the expanded chamber 22 may also be formed so as to become asymmetric with respect to the center line of the expanded chamber 22. Specifically, the expanded chamber 22 may also, for example, be formed so that the curvatures of the wall surface differ between the side above and the side below the center line of the expanded chamber 22 in the cross-section shown in FIG. 7.

By forming the expanded chamber 22 in this way so as to be asymmetric about the center line as well, the strengths of the flow of intake gas from the expanded chamber 22 along the wall surface toward the cylinder 21 differ between the side above and the side below the center line of the expanded chamber 22. As a result, it is possible to form a swirl flow in the intake gas in the combustion chamber.

Modifications

In the above embodiments, the internal combustion engine 1 is provided with only a single cylinder 21. However, the internal combustion engine 1 may also be configured to have two cylinders. In this case, the internal combustion engine having two cylinders, for example, is configured by connecting internal combustion engines shown in FIGS. 1 to 4 symmetrically to share interlocking gears. Therefore, such an internal combustion engine has two crankshafts respectively provided with two crank pins. In this case, the output shaft mounting part is, for example, connected to a crankshaft 3 at the outside of a single external timing gear.

Further, in the above embodiments, the expanded chamber 22 is provided with only a single intake opening 25. However, the expanded chamber 22 may also be configured to be provided with two or three intake openings 25. In this case, the internal combustion engine 1 has two or three intake valves 51.

Figure 9:
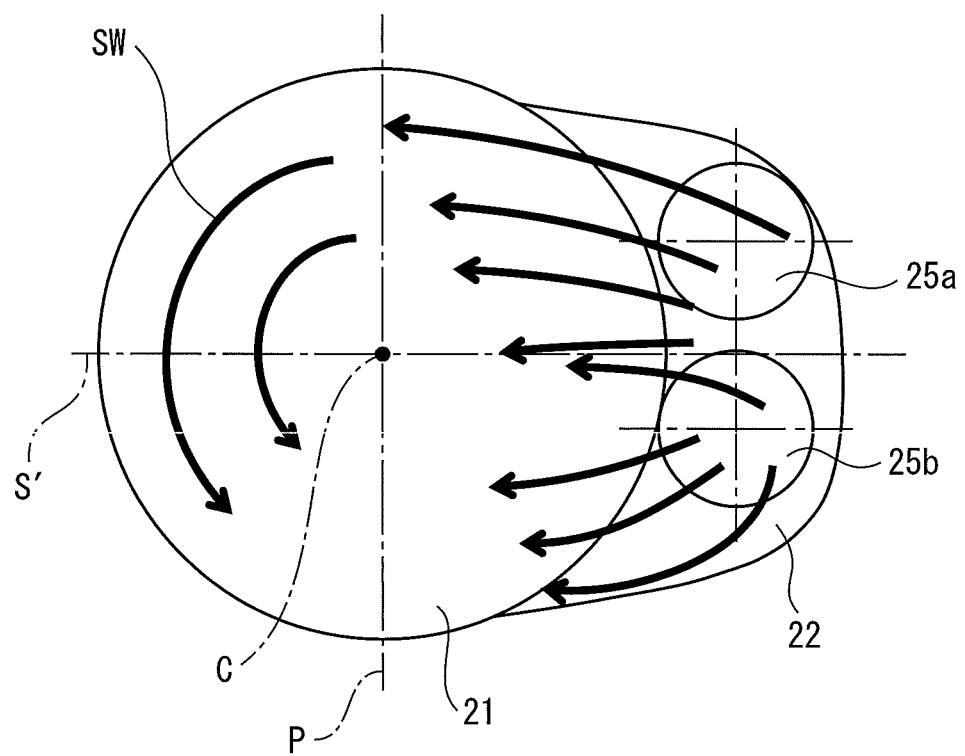
FIG. 9 is a schematic cross-sectional view of the cylinder block similar to FIG. 7 in the case where an expanded chamber is provided with two intake openings.

FIG. 9 is a schematic cross-sectional view of a cylinder block 2 similar to FIG. 7 in the case where the expanded chamber 22 is provided with two intake openings 25. As shown in FIG. 9, even when the expanded chamber 22 is provided with a plurality of intake openings 25, these intake openings 25 are arranged to be asymmetric about the center line of the expanded chamber 22, in the cross-section perpendicular to the cylinder axis C direction. In particular, in the example shown in FIG. 9, the intake openings 25a, 25b are arranged so as to be shifted upward from the positions symmetric with respect to the center line of the expanded chamber 22.

Operation of Opposed-Piston Internal Combustion Engine

Below, the operation in the internal combustion engine 1 configured as explained above will be simply explained. As shown in FIG. 1 to FIGS. 4 and 6, if the two crankshafts 3 rotate from the state where the two pistons 11 are at top dead center, along with this, the two pistons 11 move to be separated from each other. At this time, the intake valve 51 is opened by the intake cam 63b. Therefore, an air-fuel mixture of air and fuel is sucked into the combustion chamber (intake stroke).

Then, if the two pistons 11, as shown in FIG. 5, reach near bottom dead center, the intake valve 51 is closed and the two pistons 11 move to approach each other. Therefore, at this time, adiabatic compression is performed in the combustion chamber and the temperature and pressure of the air-fuel mixture in the combustion chamber rise (compression stroke). Further, if the two pistons 11 again reach near top dead center, the air-fuel mixture is ignited by the spark plug 28 and the air-fuel mixture is burned in the combustion chamber.

If the air-fuel mixture burns in the combustion chamber, the pistons 11 are pushed by the combustion pressure so as to separate from each other (expansion stroke). The pushing forces of the pistons 11 due to this combustion pressure are transmitted through the connecting rods 13 to the crankshafts 3 as the rotational drive force.

Then, when the two pistons 11 reach near bottom dead center, the exhaust valve 52 is opened by the exhaust cam 63a. Therefore, if the pistons 11 move so as to approach each other, the exhaust gas produced due to the combustion of the air-fuel mixture in the combustion chamber is exhausted by the pistons 11 to the exhaust port 26 (exhaust stroke). After that, if the two pistons 11 again reach near top dead center, the exhaust valve 52 is closed and the intake valve 51 is opened, then a similar cycle is repeated.

The invention claimed is:

1. An opposed-piston internal combustion engine configured so that one cylinder is provided with two pistons and these pistons reciprocate symmetrically with each other, comprising:

an expanded chamber formed at part of a wall of the cylinder positioned between the two pistons when a volume between the two pistons is the minimum and extending in a radial direction of the cylinder; an intake passage communicated with the expanded chamber; an exhaust passage communicated with the expanded chamber; an intake valve opening and closing the intake passage with respect to the expanded chamber; an exhaust valve opening and closing the exhaust passage with respect to the expanded chamber, and crankshafts respectively connected to the pistons, wherein the expanded chamber formed so as to stick out from a wall surface of the cylinder in the same direction as axes of rotation of the crankshafts.

2. The opposed-piston internal combustion engine according to claim 1, wherein the intake valve opens and closes an intake opening formed at the expanded chamber and communicating with the intake passage, and the intake opening is arranged so as to be positioned asymmetrically with respect to a center line of the expanded chamber running through a center axis of the cylinder and extending in the radial direction of the cylinder.

3. The opposed-piston internal combustion engine according to claim 1, wherein the expanded chamber is formed so as to be asymmetric with respect to a center line of the expanded chamber running through a center axis of the cylinder and extending in the radial direction of the cylinder.

4. The opposed-piston internal combustion engine according to claim 1, wherein the intake valve is arranged so that its axis is slanted with respect to the axis of the cylinder when viewed in the direction of the axes of rotation of the crankshafts.

5. The opposed-piston internal combustion engine according to claim 1, wherein the intake valve is arranged so as to extend from the expanded chamber to one of the crankshafts, and the exhaust valve is arranged so as to extend from the expanded chamber to the other of the crankshafts.

6. The opposed-piston internal combustion engine according to claim 5, further comprising an intake cam configured to rotate once about the one crankshaft while the one crankshaft rotates twice, wherein the intake valve is configured to be driven by the intake cam.

7. The opposed-piston internal combustion engine according to claim 5, further comprising an exhaust cam configured to rotate once about the other crankshaft while the other crankshaft rotates twice, wherein the exhaust valve is configured to be driven by the exhaust cam.

8. The opposed-piston internal combustion engine according to claim 1, further comprising a spark plug for igniting an air-fuel mixture in the expanded chamber, wherein the spark plug is arranged so as to extend within ranges of diameters of the pistons when viewed in the direction of the axes of rotation of the crankshafts.

\* \* \* \* \*